(12) United States Patent
Shingu et al.

(10) Patent No.: US 6,185,031 B1
(45) Date of Patent: Feb. 6, 2001

(54) OPTICAL SWITCHING METHOD AND OPTICAL SWITCHING APPARATUS

(75) Inventors: Masataka Shingu; Hisayoshi Yamoto; Tohru Sugimoto, all of Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/315,977

(22) Filed: May 21, 1999

(30) Foreign Application Priority Data

May 22, 1998 (JP) .................................................. 10-141427

(51) Int. Cl.[7] .............................. G02B 26/00; G02F 1/29; G02F 1/03
(52) U.S. Cl. .......................... 359/238; 359/318; 359/320; 359/251; 359/254
(58) Field of Search ..................................... 359/321, 245, 359/251, 254, 318, 320, 258, 257, 263

(56) References Cited

U.S. PATENT DOCUMENTS

| | | | |
|---|---|---|---|
| 4,879,479 | * 11/1989 | Frazier et al. | 307/425 |
| 5,157,541 | * 10/1992 | Schildkraut et al. | 359/276 |
| 5,290,485 | * 3/1994 | Gotoh et al. | 252/589 |

* cited by examiner

Primary Examiner—Georgia Epps
Assistant Examiner—Michael A. Lucas
(74) Attorney, Agent, or Firm—Ronald P. Kananen; Rader, Fishman & Grauer (57) ABSTRACT

The invention provides an optical switching method and apparatus by which the response time of a variation in refractive index of light can be further reduced. An electric field applied to a light passing element made of a substance containing conjugated system electrons is controlled to vary the condition of electrons of the substance of the light passing element to vary the refractive index of the light passing element. Then, the outgoing direction of light introduced into the light passing element is controlled to deflect the outgoing light from the light passing element, and the deflected outgoing light is introduced so as to be irradiated upon a selected control object element to control the control object element.

13 Claims, 6 Drawing Sheets

OPTICAL SWITCHING METHOD AND OPTICAL SWITCHING APPARATUS

BACKGROUND OF THE INVENTION

This invention relates to an optical switching method and an optical switching apparatus.

Usually, the refractive index of light which relies upon the fact that incoming light to a certain substance goes out at a predetermined angle is inherent to the substance.

Various proposals have conventionally been made to use an external electric field to control the refractive index of light which is an inherent value of a substance to control the advancing direction of the outgoing light.

For example, in a "Thin film switch array" of Japanese Patent Laid-Open No. Sho 52-111739, a predetermined electric field is applied to a crystal substrate made of lithium niobate and having Ti diffused herein to lower the refractive index of the substrate to perform switching of the light path of reflected light of a predetermined wavelength. Also in a "Thin film optical switch" of Japanese Patent Laid-Open No. Sho 50-115547, a predetermined electric field is applied to a substrate made of $Sr_{0.75}Ba_{0.25}Nb_2O_6$ to vary the refractive index of the substrate to perform switching of the light path of reflected light of a predetermined wavelength.

Another technique has been proposed wherein, if a voltage is applied to an organic material composed of an ultraviolet ray setting resin in which very fine particles of liquid crystal are dispersed and closed up, then the refractive index of light by the material varies, thereby varying the advancing direction of the outgoing light. This technique relies upon the fact that the direction in which liquid crystal molecules are arranged is varied by the voltage applied to the material.

It is also known that similar effects can be obtained where a photo-polymer having liquid crystal molecules on side chains, that is, ferroelectric liquid crystal (for example, the UCL-001 by Dai-Nippon Ink Industries, Co. Ltd.), is used.

However, in the method described above wherein a voltage is applied to an organic material composed of an ultraviolet ray setting resin in which very fine particles of liquid crystal are dispersed and closed up to vary the refractive index of light, the response time of the refractive index variation is less than 10 microseconds, that is, approximately several microseconds, and the response time of the refractive index variation where ferroelectric liquid crystal is used is approximately 10 to 40 microseconds.

The variation of the refractive index of light by a substance can be utilized for switching of a flow of a signal in an optical communication network or for information transmission in a liquid crystal display. In order to perform such switching or transmission operation rapidly, it is demanded to reduce the response time of the refractive index variation.

SUMMARY OF THE INVENTION

It is therefore an object of the present invention to provide an optical switching method and an optical switching apparatus by which the response time of a variation in refractive index of light can be further reduced.

In order to attain the object described above, according to an aspect of the present invention, there is provided an optical switching method, comprising the steps of controlling an electric field to be applied to a light passing element made of a substance containing conjugated system electrons to vary the condition of electrons of the substance of the light passing element to vary the refractive index of the light passing element, controlling the outgoing direction of light introduced into the light passing element thereby to deflect the outgoing light from the light passing element, and introducing the deflected outgoing light so as to be irradiated upon a selected control object element (a light detector) to control the control object element.

According to another aspect of the present invention, there is provided an optical switching apparatus, comprising a light passing element made of a substance containing conjugated system electrons, electric field application means (a pair of electrodes) for applying an electric field to the light passing element, and a plurality of control object elements (a light detector) for being controlled by light irradiated thereupon, the electric field application means controlling the intensity and/or the direction of the electric field to be applied to the light passing element to vary the condition of electrons of the substance of the light passing element to vary the refractive index of the light passing element to deflect the outgoing direction of the light introduced into the light passing element so that the outgoing light of the light passing element is irradiated upon a selected one of the control object elements to control the control object element.

According to a further aspect of the present invention, there is provided an optical switching apparatus, comprising a light passing element made of a substance containing conjugated system electrons, electric field application means for applying an electric field to the light passing element, a plurality of control object elements for being controlled by light irradiated thereupon, and an optical modulation apparatus for modulating the intensity of the light to be introduced into the controlled object element, the electric field application means controlling at least one of the intensity and the direction of the electric field to be applied to the light passing element to vary the condition of electrons of the substance of the light passing element to vary the refractive index of the light passing element to deflect the outgoing direction of the light introduced into the light passing element so that the outgoing light of the light passing element is irradiated upon a selected one of the control object elements to control the control object element.

With the optical switching method and the optical switching apparatus, by simply applying an electric field to the light passing element and controlling the intensity and/or the direction of the electric field, a variation of the condition of electrons of the light passing element can be achieved rapidly. Consequently, the response time of the variation in refractive index of the light passing element can be further reduced when compared with the prior art described hereinabove. Further, the outgoing direction of light can be deflected rapidly to perform switching of irradiation of light upon the selected control object element, and consequently, control of the control object element can be performed rapidly.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
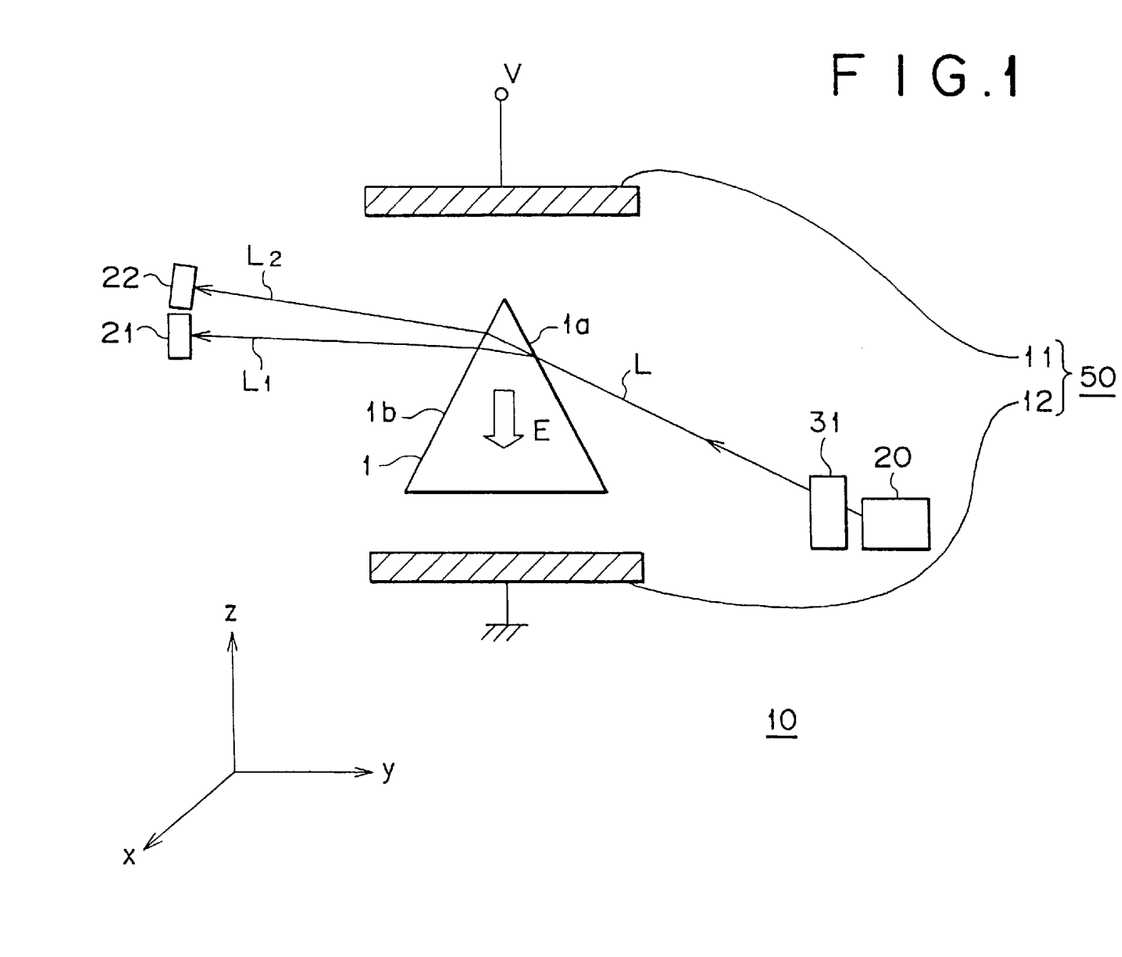
FIG. 1 is a schematic view showing a general construction of an optical switching apparatus to which the present invention is applied.

Referring first to FIG. 1, there is shown an optical switching apparatus to which the present invention is applied. The optical switching apparatus is generally denoted aS 10 and includes a light passing element 1 such as, for example, a prism, an electric field application apparatus 50, a plurality of control object elements 21 and 22, and a light detector such as, for example, a diode. The light passing element 1 is made of a substance containing conjugated system electrons hereinafter described, and has a first optical surface 1a inclined with respect to incoming light L from a light source 20 and a second optical surface 1b which does not extend in parallel to the first optical surface 1a. The electric field application apparatus 50 includes, for example, a pair of first and second electrodes 11 and 12 for applying an electric field to the light passing element 1. The control object elements 21 and 22 are each controlled by light irradiated thereupon.

More particularly, as shown in FIG. 1, the first electrode 11 and the second electrode 12 of the electric field application apparatus 50 are arranged in parallel to each other with the light passing element 1 positioned therebetween and perpendicularly to the plane of the figure, that is, an yz plane. Further, in FIG. 1, the second electrode 12 is grounded, and the potential of the first electrode 11 is controlled by a voltage source V with respect to the ground potential of the second electrode 12.

The light source 20 for emitting light to be introduced into the light passing element 1 and the first and second control object elements 21 and 22 for receiving the light from the light source 20 after having passed through the light passing element 1 are disposed on the opposite side to the light source 20 with respect to the light passing element 1.

Here, the substance of the material composing the light passing element 1 which contains conjugated system electrons is defined in the following manner.

In the molecular theory, a structure wherein double bonds and single bonds are linked alternately is called a structure of a conjugated double bond, and a structure wherein triple bonds and single bonds are linked alternately is called a conjugated triple bond. Further, these two structures are collectively called a structure of a conjugated multiple bond. Materials having the conjugated multiple bond are used as a material for the light passing element 1.

Also, either a structure having only one double bond or another structure having only one triple bond is included in the conjugated multiple bond.

The structures of a conjugated multiple bond may not be those wherein atoms of the same type are bonded, but include those of a structure wherein atoms of different types are bonded to form a conjugated multiple bond.

Further, the structures of a conjugated multiple bond may include those of a structure which includes a double bond and unpaired electrodes such as, for example, an allyl group and those of another structure which includes a double bond and lone electron pairs such as, for example, acetamide.

Also a substance which includes a hyperconjugation of pseudo-π (pi) electrons such as, for example, the methyl group, is included in the substance which contains conjugated system electrons here.

In particular, the conjugated system electrons are π electrons, unpaired electrodes, lone electron pairs or pseudo-π electrons. Such a substance as includes at least one of those conjugated system electrons is called a substance containing conjugated system electrons.

Such conjugated system electrons have a nature that they are liable to be influenced by an external electric field. This is because, if an external electric field is applied, then conjugated system electrons migrate along bonds.

Particularly with a substance having a structure of a conjugated multiple bond which includes a large number of π electrons, since the extent of π electrons is large, the π electrons can move readily as much and are influenced strongly by an external electric field.

Further, where molecules are not electrically neutral and a positive or negative electric bias is present, the π electrons are influenced further strongly by an external electric field.

In this manner, when an external electric field is applied to a substance which contains conjugated system electrons, the conditions of electrons, that is, the distribution of conjugated system electrons in molecules, varies from that in an alternative case wherein no external electric field is applied.

The variation of the condition of electrons depends upon the direction and the intensity of an external electric field applied to a substance which contains conjugated system electrons.

Therefore, a substance which contains conjugated system electrons has a nature that, if an external electric field is applied, also the degree of light absorption by molecules of the substance varies.

Also, this nature is influenced comparatively strongly by an external electric field where molecules are not electrically neutral and a positive or negative electric bias is present.

The time required for a condition variation by an external influence of above-mentioned molecules of a substance containing conjugated type electrons will be described below taking light absorption as an example.

A substance containing conjugated system electrons absorbs light of ultraviolet rays, visible rays, infrared rays or the like as an increase of kinetic energy of conjugated system electrons.

Light absorption occurs within a time required for light to pass through molecules. For example, the time required for light having a wavelength of 500 nm to advance over a one waveform distance is determined in accordance with:

$$500 \times 10^{-9} \text{ (m)}/3 \times 10^8 \text{ (m/s)}$$

and consequently, $1.67 \times 10^{-15}$ (s), that is, approximately 2 femto-seconds ($10^{-15}$ seconds).

In other words, it can be recognized that an electron condition variation by light absorption of molecules of a substance containing conjugated system electrons occurs in approximately 2 femto-seconds ($10^{-15}$ seconds).

The foregoing description regarding light absorption similarly applies to other characteristics as a condition variation of molecules of a substance containing conjugated system electrons by an external influence, for example, when an external electric field is applied. In other words, any condition variation of molecules of a substance containing conjugated system electrons by an external electric field occurs in approximately 2 femto-seconds ($10^{-15}$ seconds).

One of statuses or characteristics of a substance which varies by an external influence is, for example, an optical characteristic such as, for example, a refractive index.

A refractive index of a substance satisfies a relationship:

the square of refractive index=(dielectric constant)×(magnetic permeability)

and is a physical quantity peculiar to the substance.

Accordingly, it can be recognized that also the refractive index exhibits a condition variation by an influence of an external electric field, and the variation of the refractive index occurs in approximately 2 femto-seconds ($10^{-15}$ seconds).

The reason why the time required for a condition variation of molecules of a substance containing conjugated system electrons by an external influence is much shorter than that of a substance applied by the conventional optical switching apparatus described above originates from the fact that, while atoms or molecules must be moved for a condition variation of the substance applied by the conventional optical switching apparatus described above, with the optical switching apparatus of the present invention, it is required only to move electrons (i.e., conjugated system electrons) whose mass is approximately 1/1,800 that of atoms.

In the following, a method of performing optical switching using the optical switching apparatus 10 shown in FIG. 1 will be described.

In the optical switching apparatus 10 of the present invention shown in FIG. 1, a first potential $V_1$ is provided to the first electrode 11 to apply a predetermined electric field $E_1$ between the first electrode 11 and the second electrode 12.

Light L is introduced into the light passing element 1 from the light source 20. This light L is any of far infrared rays, infrared rays, near infrared rays, visible rays, near ultraviolet rays, ultraviolet rays and far ultraviolet rays.

At this time, the incoming light L is refracted by and goes out from the light passing element 1, and the outgoing light $L_1$ is irradiated upon the first control object element 21 of, for example, the light detector.

Then, the electric field application apparatus 50 is controlled to provide a second potential $V_2$ different from the first potential $V_1$ to the first electrode 11 to apply an electric field $E_2$ different from the electric field $E_1$ mentioned above between the first electrode 11 and the second electrode 12.

By controlling the electric field to be applied to the light passing element 1 in this manner by means of the electric field application apparatus 50, the electron condition of the substance of the light passing element 1 containing conjugated system electrons is varied and the refractive index of the light passing element 1 is varied.

Consequently, light $L_2$ going out from the light passing element 1 advances in a direction different from that of the outgoing light $L_1$ where the predetermined electric field $E_1$ described above is applied, and is irradiated upon the second control object element 22, which may be a light detector.

In other words, the outgoing light going out from the light passing element 1 can be deflected to control the advancing direction of it so that it can be irradiated upon a selected control object element, for example, a light detector.

Further, as shown in FIG. 1, in the optical switching apparatus 10 of the present invention, the intensity of light emitted from the light source 20 may be modulated by an optical modulation apparatus 31 to optimize the amounts of light to be introduced into the control object element 21 or 22.

As described above, the electric field to be applied to the light passing element 1 can be controlled by the electric field application apparatus 50 so that light can be selectively irradiated upon a plurality of control object elements, for example, the control object elements 21 and 22, thereby to control the control object elements. For example, the optical switching apparatus 10 can be utilized as an optical communication apparatus wherein the advancing direction of light is converted into a signal, or can be utilized also for various illumination apparatus, exposure apparatus, temperature sensors, liquid crystal display units and so forth.

Figure 2:
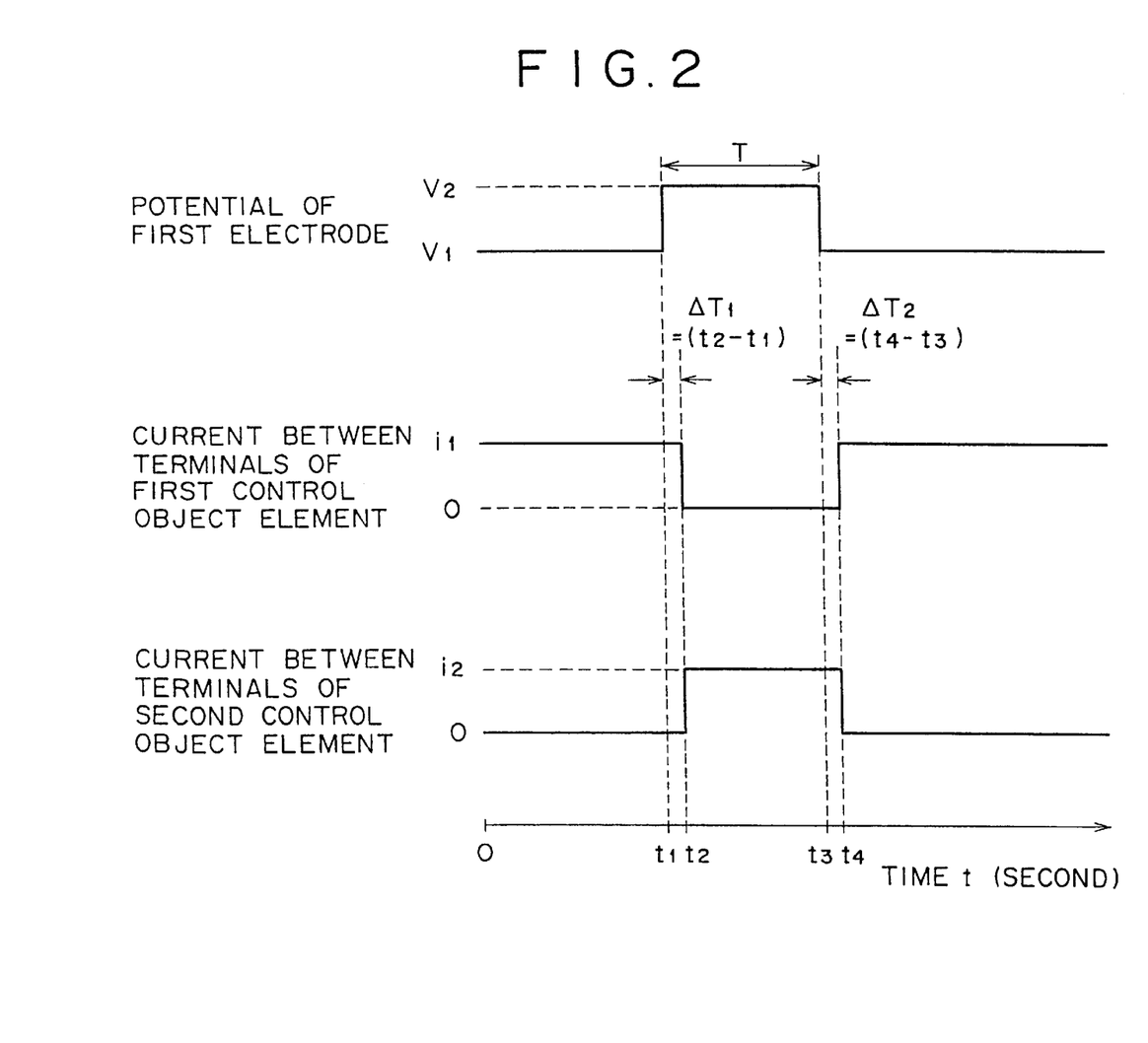
FIG. 2 is a waveform diagram illustrating condition of currents flowing through terminals of a first light detector and a second light detector before and after the magnitude of an electric field is varied using the optical switching apparatus of FIG. 1.

FIG. 2 illustrates condition of electric currents flowing through the first control object element 21 and the second control object element 22 before and after the magnitude of the electric field is provided with a variation using the optical switching apparatus 10 of the present invention shown in FIG. 1. It is assumed that, in the optical switching apparatus 10 of FIG. 1, a light detector is used for the control object elements 21 and 22 and has a function of detecting light when light is irradiated upon the light detector and electric current flows between terminals thereof.

Referring to FIG. 2, the potential $V_1$ is provided to the first electrode 11 which forms the electric field application apparatus 50 to apply the predetermined electric field $E_1$ between the first electrode 11 and the second electrode 12.

Consequently, as described above, the outgoing light $L_1$ from the light passing element 1 is irradiated upon the first control object element 21, and as a result, first current $i_1$ flows through the control object element 21. Further, at this time, since no light is irradiated upon the second control object element 22, no electric current flows through the control object element 22.

Then, as shown in FIG. 2. after $t_1$ seconds, the second potential $V_2$ different from the first potential $V_1$ is provided to the first electrode 11 to apply another electric field $E_2$ between the first electrode 11 and the second electrode 12. Consequently, after $\Delta T_1=(t_2-t_1)$ second since when the potential to be supplied is switched from $V_1$ to $V_2$, it is detected that the current flowing through the first control object element 21 becomes equal to 0 and current $i_2$ flows through the second control object element 22.

Then, after T second since when the potential to the first electrode 11 is switched to $V_2$, the potential is switched back to $V_1$ to apply the electric field $E_1$ between the first electrode 11 and the second electrode 12.

As a result, after $\Delta T_2=(t_4-t_3)$ second since the switching of the potential, the current flowing through the control object element 21 becomes equal to $i_1$, and the current flowing through the second control object element 22 becomes equal to 0.

Since a condition variation of molecules of a substance containing conjugated system electrons by an external influence occurs in approximately 2 femto-seconds ($10^{-15}$ seconds) as described above, it can be recognized that the variation times $\Delta T_1$ and $\Delta T_2$ of electric current flowing through the first and second control object elements 21 and 22 illustrated in FIG. 2 are approximately 2 femto-seconds ($10^{-15}$ seconds).

It is to be noted that the time T seconds after the potential of the first electrode 11 is switched from $V_1$ to $V_2$ until the potential is switched back to $V_1$ illustrated in FIG. 2 depends upon threshold values of the first and second control object elements 21 and 22 shown in FIG. 1. Accordingly, if a control object element having a low threshold value is employed, then the optical switching apparatus 10 can be utilized, for example, for digital communication of a very high frequency.

It is to be noted that the wavelength of light to be emitted from the light source 20 shown in FIG. 1 must be selected depending upon a substance to be applied to the light passing element 1. This will be described below.

An example of wavelengths of incident light L applied where butadiene, hexatriene, tryptophan and phytochromobilin are used as a substance to be applied to the light passing element 1 is given in Table 1 below.

Here, the magnitude of a conjugation system in Table 1 below signifies a. range of an extent of π electrons.

TABLE 1

| Substance of light passing element | Magnitude of conjugate system | Maximum wavelength of absorption band | Optimum wavelength |
|---|---|---|---|
| Butadiene | 0.4 nm | 235 nm | 300 nm or more |
| Hexatriene | 0.65 nm | 263 nm | 350 nm or more |
| Tryptophan | 0.5 nm | 280 nm | 400 nm or more |
| Phytochromobilin | 1.5 nm | 690 nm | 800 nm or more |

As shown in Table 1 above, the maximum wavelength of the absorption band of butadiene, that is, the wavelength at which butadiene exhibits maximum absorption in its absorption band, is 235 nm, and taking the extent of the absorption band into consideration, the light to be applied can be determined as light whose wavelength is 300 nm or more which is approximately 1.4 times the maximum wavelength.

Similarly, the maximum wavelength of the absorption band of hexatryene is 275 nm, and taking the extent of the absorption band into consideration, the light to be applied can be determined as light whose wavelength is 350 nm or more.

The maximum wavelength of the absorption band of tryptophan is 280 nm, and taking the extent of the absorption band into consideration, the light to be applied can be determined as light whose wavelength is 400 nm or more.

Figure 3:
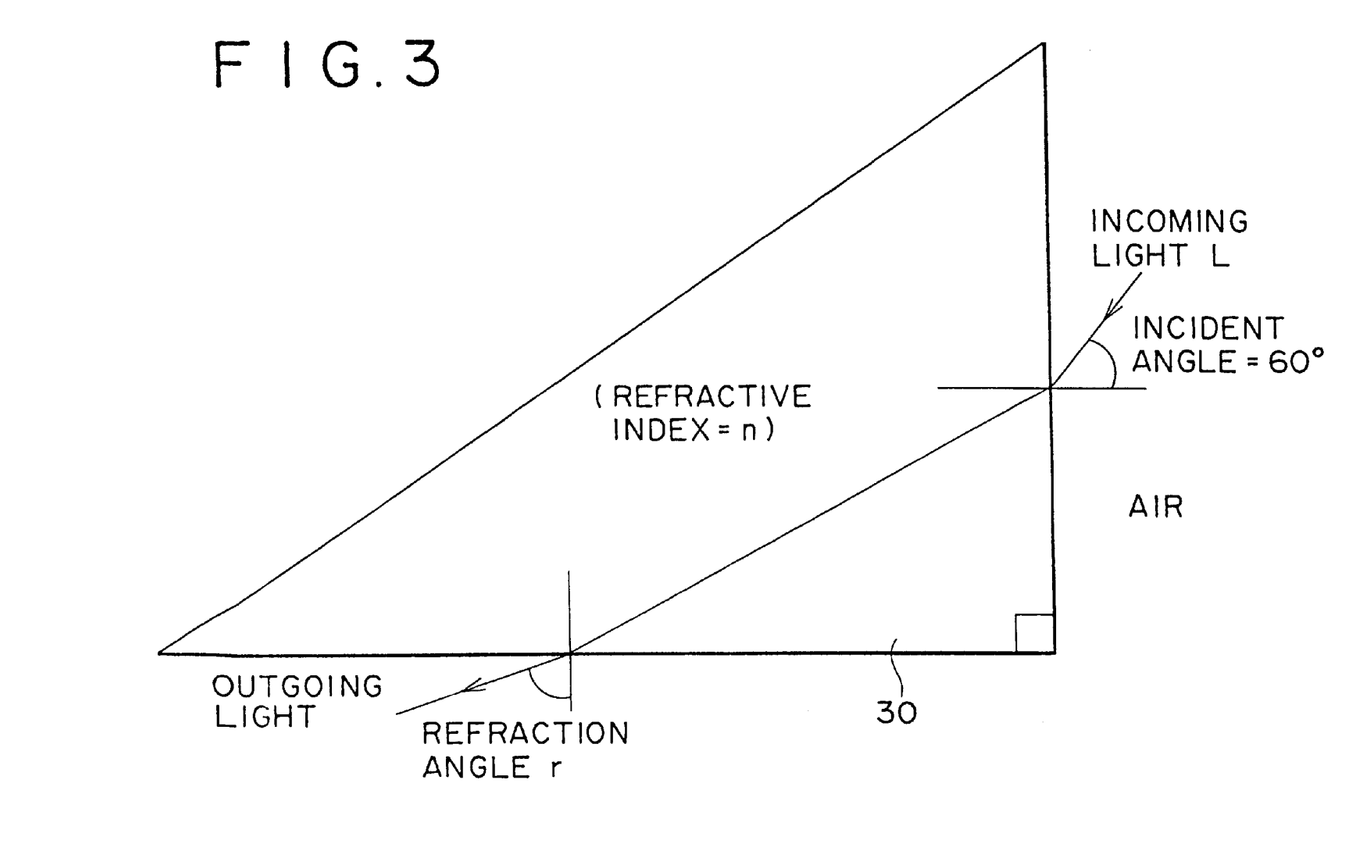
FIG. 3 is a diagrammatic view illustrating a manner of refraction of outgoing light when the incoming angle to a prism is set to 60 degrees.

The maximum wavelength of the absorption band of photochromobylene is 690 nm, and taking the extent of the absorption band into consideration, the light to be applied can be determined as light whose wavelength is 800 nm or more.

Where light L is introduced into a prism 30 made of such a conjugated system electron containing substance as described above at an incident angle of 60 degrees as shown in FIG. 3, if the refraction index n of the prism 30 is varied from 1.28 to 1.32, then the prism 30 exhibits such a refraction angle r of outgoing light and a variation amount Δr of the refraction angle with reference to a case wherein n is 1.30 as given in Table 2 below.

TABLE 2

| Refractive index (n) | Angle of refraction (r) | Variation amount (Δr) of angle of refraction |
|---|---|---|
| 1.28 | 70.48 ° | −5.34 ° |
| 1.29 | 72.96 ° | −2.86 ° |
| 1.30 | 75.82 ° | 0 ° |

TABLE 2-continued

| Refractive index (n) | Angle of refraction (r) | Variation amount (Δr) of angle of refraction |
|---|---|---|
| 1.31 | 79.39 ° | +3.57 ° |
| 1.32 | 85.00 ° | +9.28 ° |

It is to be noted that, where the incident angle is 60°, the angle of refraction is r degrees and the refractive index is n, the following relational expression is satisfied:

$$r = \sin^{-1}[n \times \sin\{90 - \sin^{-1}(\sin 60/n)\}]$$

According to Table 2, it can be seen that, if the refractive index n varies by 0.01, then the advancing direction of the outgoing light varies as large as approximately 3.57 degrees. Further, in this instance, the variation of the dielectric constant is only 0.03 from approximately 1.69 to approximately 1.72, that is, only approximately 1.5%.

As described above, in the optical switching apparatus 10 shown in FIG. 1, the first electrode 11 and the second electrode 12 of the electric field application apparatus 50 are disposed perpendicularly to the plane of the figure, that is, to the yz plane across the light passing element 1. However, the present invention is not limited to the specific arrangement and can be applied similarly to another arrangement wherein an electric field application apparatus including two or more pairs of electrodes is provided such that another pair of electrodes are provided in parallel to the plane of the figure, that is, to the yz plane, across the light passing element 1.

Figure 4:
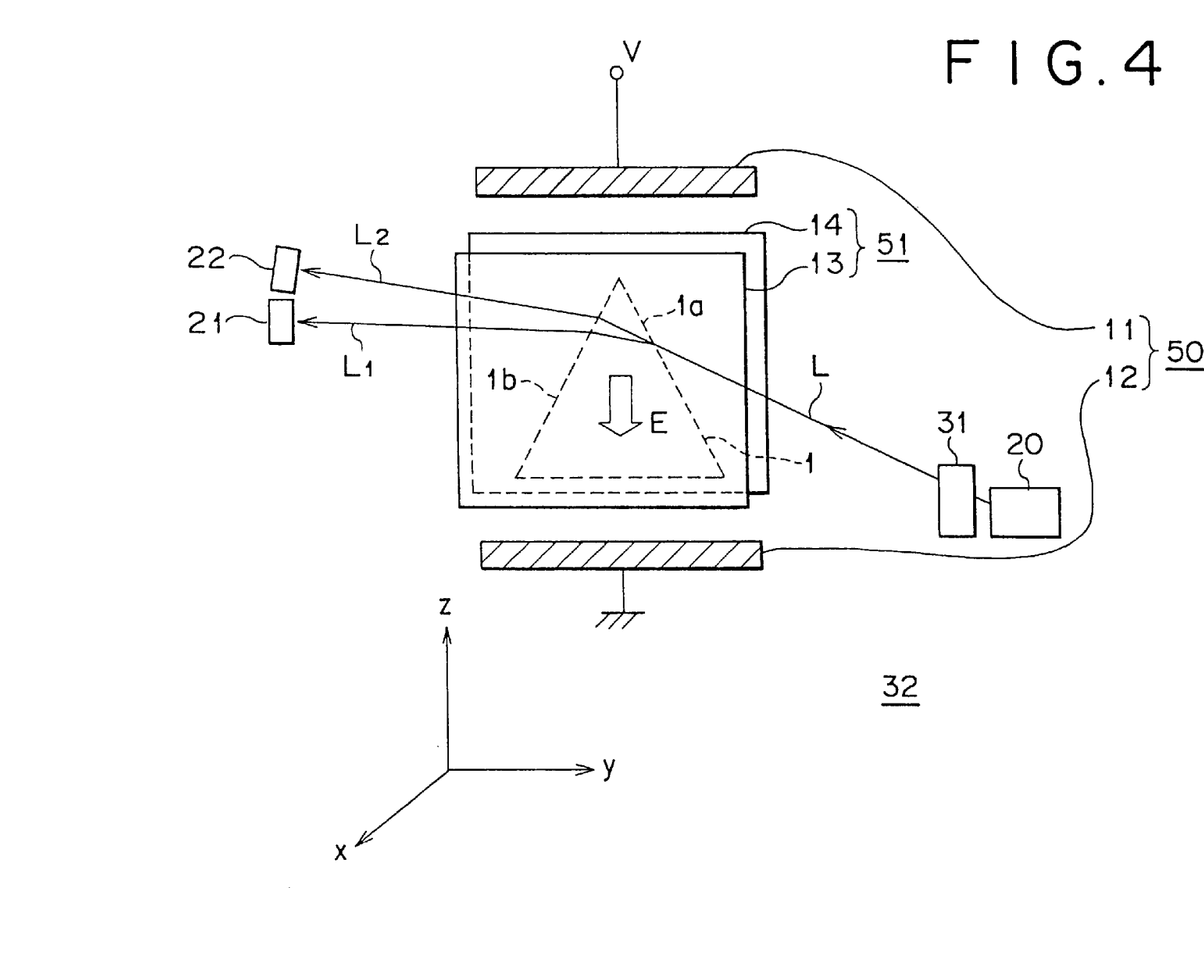
FIG. 4 is a schematic view showing a general construction of another optical switching apparatus to which the present invention is applied.

In FIG. 4, same reference numerals are used as those in FIG. 2 in case they correspond to each other.

FIG. 4 shows an optical switching apparatus 32 wherein a third electrode 13 and a fourth electrode 14 are arranged in parallel to each other across the light passing element 1 such that they extend in parallel to the plane of the figure, that is, to the yz plane.

In the optical switching apparatus 32 shown in FIG. 4, a predetermined electric field is applied by the electric field application apparatus 50 including the first electrode 11 and the second electrode 12, and another predetermined electric field is applied by another electric field application apparatus 51 including the third electrode 13 and the fourth electrode 14, and the intensities and the directions of the electric fields are adjusted.

Thus, similarly as in the arrangement described hereinabove with reference to FIG. 1, the outgoing direction of light is switched between $L_1$ and $L_2$ to perform switching of light irradiation to a selected one of the first control object element 21 and the second control object element 22 to control the selected control object element.

Figure 5:
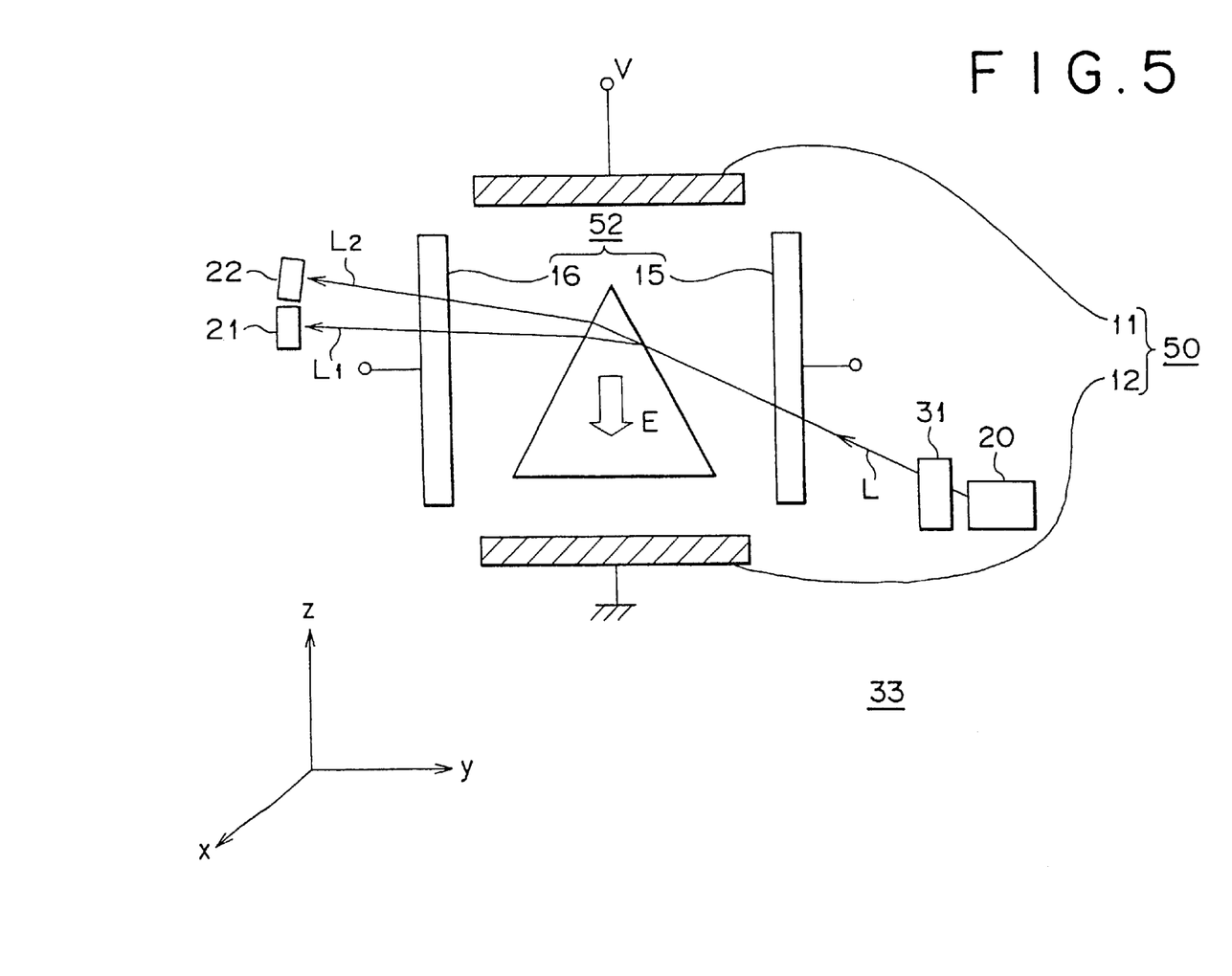
FIG. 5 is a schematic view showing a general construction of a further optical switching apparatus to which the present invention is applied.

Further, the optical switching apparatus of the present invention may be formed with such a structure as shown in FIG. 5. FIG. 5 shows an optical switching apparatus 33 wherein a fifth electrode 15 and a sixth electrode 16 which composes an electric field application apparatus 52 are arranged in a plane perpendicular to the plane of the figure, that is, to the yz plane, or in other words, in such a positional relationship wherein they extend perpendicularly to the first electrode 11 and the second electrode 12.

In this instance, each of the fifth electrode 15 and the sixth electrode 16 is, at least at part thereof or at the entirety thereof, transparent or translucent so that incident light L passes therethrough.

In the optical switching apparatus 33 of the structure shown in FIG. 5, a predetermined electric field is applied by the electric field application apparatus 50 including the first electrode 11 and the second electrode 12 and another electric field is applied similarly by the electric field application apparatus 52 including the fifth electrode 15 and the sixth electrode 16, and the intensities and the directions of the electric fields are adjusted.

In this manner, similarly as in the arrangement described hereinabove with reference to FIG. 1, the outgoing direction of light is switched between $L_1$ and $L_2$ to perform switching of light irradiation upon a selected one of the control object element 21 and the control object element 22 to control the selected control object element.

Further, according to the present invention, the electric field application apparatus 50, 51 and 52 described hereinabove with reference to FIGS. 1, 4 and 5 can be combined to obtain a construction wherein three pairs of electrodes including the first electrode 11 to the sixth electrode 16 are provided.

Also the electrodes 11 to 14 may be formed transparent or translucent with respect to incident light.

The light passing element 1 which composes the optical switching apparatus of the present invention can be formed from various substances containing conjugated system electrons given listed below.

For example, β-carotene, phycoxanthine and the like as carotinoid type materials; flavone; flavonol; flavin, anthocyanin and the like as anthocyan type materials; and tetrapyrrole derivatives and so forth as porphyrin type materials can be used. Further, amino acid, nucleic acid, hydrocarbon type compounds such as ethylene, polyacetylene and so forth as conjugated system electron containing substances having a triple bond, and vitamin A and so forth as substances containing hyper-conjugated system electrons can be used.

Further, not only organic substances but also inorganic substances can be applied similarly if they contain conjugated system electrons. For example, glass, silicon dioxide and so forth can be applied similarly.

Furthermore, mixtures of the organic substances described above and mixtures of the inorganic substances described above as well as mixtures of the organic substances and the inorganic substances can be applied in accordance with various conditions and applications.

Figure 6A:
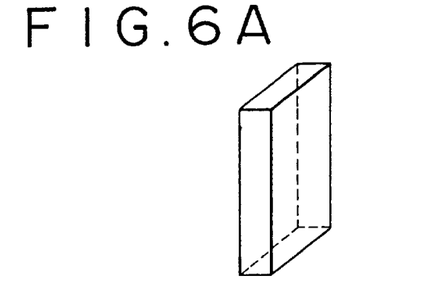
FIGS. 6A to 6H are schematic views showing different examples of a shape of a light passing element which can be employed in an optical switching apparatus according to the present invention.
Figure 6B:
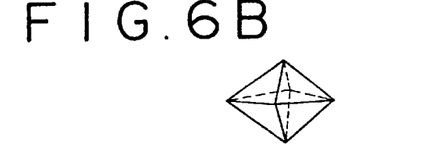
Figure 6C:
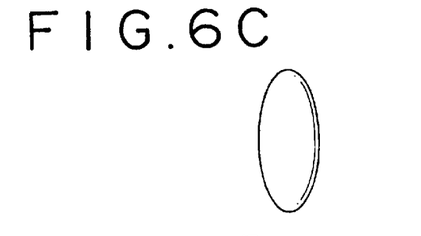
Figure 6D:
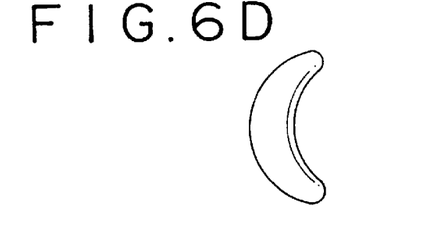
Figure 6E:
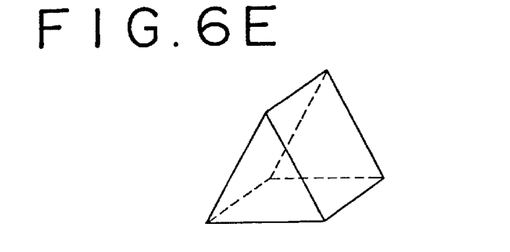
Figure 6F:
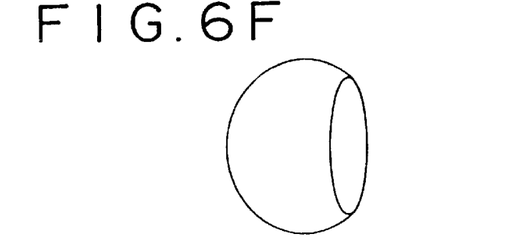
Figure 6G:
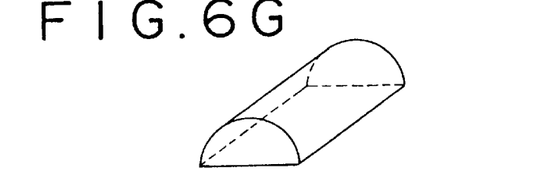
Figure 6H:
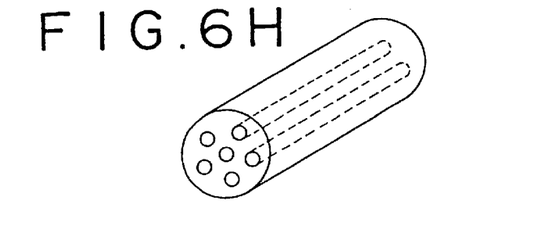

Further, the light passing element 1 used in the optical switching apparatus of the present invention need not necessarily have such specific shapes as described above in connection with the several embodiments of the present invention and may have any of such various shapes as shown in FIGS. 6A to 6H. For example, the light passing element 1 may have such a plate-like or square pole-like shape as shown in FIG. 6A, such a polyhedron-like shape as shown in FIG. 6B, such an ellipsoid-of-revolution-like shape as shown in FIG. 6C, such a meniscus lens-like shape as shown in FIG. 6D, such a triangular pole-like (prism-like) shape as shown in FIG. 6E, such a shape of a three-dimensional body obtained by cutting a sphere along a plane as shown in FIG. 6F, such a semicircular pole-like shape as shown in FIG. 6G, and such a shape of a bar having hollows therein as shown in FIG. 6H. Further, a spherical shape, a conical shape, a triangular pyramid shape, a polygonal pyramid shape, a ring shape, a polygonal bar shape, a shape of a three-dimensional body obtained by cutting a square pyramid along a plane parallel to the bottom, a shape of a three-dimensional body obtained by curving side faces of a square pole outwardly or inwardly, a shape of a three-dimensional body obtained by curving at least one of side faces of a polygonal pole outwardly or inwardly, a shape of a three-dimensional body obtained by curving the generating line of a cone outwardly or inwardly, a shape of a three-dimensional body having a combination of curved faces and flat faces, a shape of a three-dimensional body having a combination of a plurality of curved faces and so forth can be applied only if incident light can be refracted by the light passing element.

Further, where the conjugated system electron containing substance of the light passing element 1 described above is a solid body, it can be worked into various shapes, but where it is liquid, it can be applied in a condition wherein it is enclosed in a vessel made of a material transparent with respect to incident light such as glass or quartz and having various kinds of shapes. Further, where it is gas, it can be applied in a condition wherein it is enclosed in a vessel made of a material transparent with respect to incident light such as glass or quartz and having various kinds of shapes.

While preferred embodiments of the present invention have been described using specific terms, such description is for illustrative purposes only, and it is to be understood that changes and variations may be made without departing from the spirit or scope of the following claims.

What is claimed is:

1. An optical switching method, comprising the steps of:
   controlling an electric field applied to a light passing element made of a substance containing conjugated system electrons to vary the condition of electrons of the substance of the light passing element to vary the refractive index of the light passing element;
   controlling the outgoing direction of light introduced into the light passing element thereby to deflect the outgoing light from the light passing element; and
   introducing the deflected outgoing light so as to be irradiated upon a selected control object element to control the control object element.

2. An optical switching method according to claim 1, wherein each of said control object elements is a light detection element.

3. An optical switching method according to claim 1, wherein the light to be introduced into said light passing element is one of infrared rays, visible rays and ultraviolet rays.

4. An optical switching apparatus, comprising:
   a light passing element made of a substance containing conjugated system electrons;
   electric field application means for applying an electric field to said light passing element; and
   a plurality of control object elements for being controlled by light irradiated thereupon;
   said electric field application means controlling the intensity and/or the direction of the electric field applied to said light passing element to vary the condition of electrons of the substance of said light passing element to vary the refractive index of said light passing element to deflect the outgoing direction of the light introduced into said light passing element so that the outgoing light of said light passing element is irradiated upon a selected one of said control object elements to control the control object element.

5. An optical switching apparatus according to claim 4, wherein each of said control object elements is a light detection element.

6. An optical switching apparatus according to claim 4, wherein said electric field application means includes at least a pair of electrodes.

7. An optical switching apparatus according to claim 4, wherein at least part of said electric field application means is transparent or translucent so that the incident light may pass therethrough.

8. An optical switching apparatus according to claim 4, wherein the light to be introduced into said light passing element is one of infrared rays, visible rays and ultraviolet rays.

9. An optical switching apparatus, comprising:
   a light passing element made of a substance containing conjugated system electrons;
   electric field application means for applying an electric field to said light passing element;
   a plurality of control object elements for being controlled by light irradiated thereupon; and
   an optical modulation apparatus for modulating the intensity of the light to be introduced into the controlled object element;
   said electric field application means controlling at least one of the intensity and the direction of the electric field applied to said light passing element to vary the condition of electrons of the substance of said light passing element to vary the refractive index of said light passing element to deflect the outgoing direction of the light introduced into said light passing element so that the outgoing light of said light passing element is irradiated upon a selected one of said control object elements to control the control object element.

10. An optical switching apparatus according to claim 9, wherein each of said control object elements is a light detection element.

11. An optical switching apparatus according to claim 9, wherein said electric field application means includes at least a pair of electrodes.

12. An optical switching apparatus according to claim 9, wherein at least part of said electric field application means is transparent or translucent so that the incident light may pass therethrough.

13. An optical switching apparatus according to claim 9, wherein the light to be introduced into said light passing element is one of infrared rays, visible rays and ultraviolet rays.

* * * * *